(12) United States Patent
Zhang et al.

(10) Patent No.: US 12,167,476 B2
(45) Date of Patent: Dec. 10, 2024

(54) ROOT SELECTION FOR RANDOM ACCESS

(71) Applicant: ZTE Corporation, Guangdong (CN)

(72) Inventors: Chenchen Zhang, Guangdong (CN); Wei Cao, Guangdong (CN); Nan Zhang, Guangdong (CN); Kaibo Tian, Guangdong (CN); Zhen Yang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 348 days.

(21) Appl. No.: 17/853,213

(22) Filed: Jun. 29, 2022

(65) Prior Publication Data
US 2022/0338274 A1 Oct. 20, 2022

Related U.S. Application Data

(63) Continuation of application No. PCT/CN2020/070255, filed on Jan. 3, 2020.

(51) Int. Cl.
H04W 74/0833 (2024.01)
H04J 13/00 (2011.01)
H04W 72/0453 (2023.01)
H04W 74/08 (2024.01)

(52) U.S. Cl.
CPC ..... *H04W 74/0841* (2013.01); *H04J 13/0062* (2013.01); *H04W 72/0453* (2013.01); *H04W 74/0866* (2013.01)

(58) Field of Classification Search
CPC ......... H04W 74/0866; H04W 74/0841; H04W 72/0453; H04J 13/0062

USPC ........................................................ 370/329
See application file for complete search history.

(56) References Cited

U.S. PATENT DOCUMENTS

| 2014/0321398 | A1 | 10/2014 | Guo et al. |
| 2014/0341010 | A1 | 11/2014 | Jiang et al. |
| 2018/0084586 | A1 | 3/2018 | McCoy et al. |

FOREIGN PATENT DOCUMENTS

| CN | 103081425 A | 5/2013 |
| CN | 103200694 A | 7/2013 |
| WO | 2012027880 A1 | 3/2012 |

OTHER PUBLICATIONS

3GPP document R1-1912954 (Year: 2019).*
European Search Report for EP Patent Application No. 20886427.2, dated on Nov. 18, 2022, 6 pages.
Qualcomm Incorporated, "Evaluations of 2-Rooted PRACH Preamble," 3GPP TSG RAN WG1 #98bis, R1-1911113, Chongqing, China, Oct. 14-20, 2019, 9 pages.

(Continued)

*Primary Examiner* — Peter G Solinsky
(74) *Attorney, Agent, or Firm* — Perkins Coie LLP

(57) ABSTRACT

Techniques are described for selecting root pairs for Zadoff-Chu sequences for random access preamble and for signaling one or more values associated with the root pair to a user equipment (UE) by a base station. The described root pair selection methods for two-root physical random access channel (PRACH) preamble can enable the peak differences received at the UE from different frequency offsets (FOs) to be disjointed even considering error in UE side. The selection techniques can improve the performance of PRACH FO and time offset (TO) estimation.

20 Claims, 10 Drawing Sheets

(56) References Cited

OTHER PUBLICATIONS

Qualcomm Incorporated, "Evaluations of 2-Rooted PRACH Preamble," 3GPP TSG RAN WG1 #99, R1-1912954, Reno, USA, Nov. 18-22, 2019, Resubmission of 1911113, 9 pages.
Qualcomm Incorporated, "RACH Procedure and UL Timing Control for NTN," 3GPP TSG RAN WG1 #99, Reno, USA, R1-1912956, 10 pages, Nov. 18-22, 2019.
International Search Report and Written Opinion for International Application No. PCT/CN2020/070255, mailed on Aug. 31, 2020 (7 pages).
Chinese office action issued in CN Patent Application No. 202080080319.3, dated Jul. 1, 2024, 9 pages. English translation included.
European Communication pursuant to Article 94(3) EPC issued in EP Patent Application No. 20886427.2, dated Oct. 2, 2024, 4 pages.

\* cited by examiner

ROOT SELECTION FOR RANDOM ACCESS

CROSS-REFERENCE TO RELATED APPLICATIONS

This application is a continuation of International Patent Application No. PCT/CN2020/070255, filed on Jan. 3, 2020, the contents of which are incorporated herein by reference in their entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for selection of root values for random access channel.

A first example wireless communication method comprises determining, by a network node, a first set of root values for first set of Zadoff-Chu (ZC) sequences, determining, by the network node, a second set of root values for a second set of ZC sequences based on the first set of root values and a plurality of gap values, where the plurality of gap values describes differences between inverses of root values from the first set of root values and corresponding inverses of root values from the second set of root values, and transmitting, by the network node to a communication node, the first set of root values and the second set of root values.

A second example wireless communication method comprises determining, by a network node, a first set of root values for a first set of Zadoff-Chu (ZC) sequences, determining, by the network node, a plurality of gap values that describe differences between inverses of root values from the first set of root values and corresponding inverses of root values from a second set of root values for a second set of ZC sequences, and transmitting, by the network node to a communication node, the first set of root values and the plurality of gap values.

A third example wireless communication method comprises receiving, by a communication node, either a first set of root values and a second set of root values or the first set of root values and a plurality of gap values, where each of the first set of root values and the second set of root values includes plurality of root values for Zadoff-Chu (ZC) sequences, and where the plurality of gap values describe differences between inverses of root values from the first set of root values and corresponding inverses of root values from the second set of root values, and selecting a first root value from the first set of root values and a corresponding second root value from the second set of root values to obtain a pair of root values.

A fourth example wireless communication method comprises receiving, by a communication node from a network node, an index value associated with a first root value for a Zadoff-Chu (ZC) sequence and a first gap value, where the first gap value describes a difference between an inverse of the first root value and an inverse of a second root value for a second ZC sequence, and determining, by the communication node using a predefined table and based on at least the index value, a first set of root values that includes the first root value and a set of corresponding gap values that includes the first gap value.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

This patent document describes techniques for selection of root values for random access channel. For example, a two-root physical random access channel (PRACH) preamble can be used to estimate very large frequency offset (FO). The selecting of the root pairs can affect the performance of the preamble. Thus, this patent document describes techniques to design and select the root pairs that can improve wireless performance.

In an example scenario of a low earth orbit (LEO) satellite communication, a base station (BS) has a very high speed and hence leads to large frequency offset (FO) in the wireless channel. Similarly, in another example scenario of air-to-ground (ATG), a user equipment (UE) has a high speed, which also causes large FO. The large FO will cause shift of the correlation peaks in NR PRACH. Suppose the ZC sequence has length N, root u and the FO is k·SCS, then the correlation peaks will be shifted by $k \cdot u^{-1}$, where $u^{-1}$ and the shift are with respect to mod(N). Because the large FO and time offset (TO) both affect the position of the correlation peak, the receiver cannot estimate the FO and TO.

Figure 1:
FIG. 1 shows an example of a two-root preamble.

A solution for the large FO estimation is to use ZC sequences with different root values in one PRACH preamble. FIG. 1 shows an example of a two-root preamble, where $u_i$ denotes a ZC sequence with root value $u_i$ and a known cyclic shift (e.g., 0). Since the two ZC sequences have the same time delay at receiver side, the positions of the two correlation peaks have difference $(u_1^{-1} - u_2^{-1}) \cdot k \pmod{N}$ when the FO is k·SCS.

The two-root preamble has many forms other than the example in FIG. 1. But the selection of the root pair $(u_1, u_2)$ affects the performance of the PRACH preamble. Thus, this patent document describes the design the root pairs where the characteristics of proposed techniques include: (1) the principle and several methods of root pair selection, which can be used in network to UE configurations; and (2) possible signaling used to indicate the configuration of root pair. The benefits of the proposed root pair selection method described in this patent document include an effective alleviation of the ambiguity of frequency offset estimation (FOE) or time offset estimation (TOE) error at the receiver side.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Root Pair Selection Method

In a given cell, the amplitude of maximum FO (or the maximum integer value of FO) is generally known to the network or base station according to deployment. Let maximum FO denote the maximum absolute value of the possible FO in a cell or a system. Suppose the maximum FO value is smaller than (K+0.5) SCS, then the possible differences of the two peaks are $\{(u_1^{-1} - u_2^{-1}) \cdot k \pmod{N}; k = -K, -K+1, \ldots, K\}$, where K is the maximum integer value associated with FO. At the receiver or UE side, the peaks may be incorrectly positioned. Statistical analysis shows that the error may be a part of a set of errors determined by $u_2$ and can be avoided by design of the root pairs. An example technique to perform root pair selection can include designing $u_1^{-1} - u_2^{-1}$ such that different k leads to different possible values for $(u_1^{-1} - u_2^{-1})$ even considering the errors in receiver side. In fact, let errSet denote the set of possible errors in receiver side, the $s = u_1^{-1} - u_2^{-1}$ is designed such that $(s \cdot k_1 + \text{errSet}) \cap (s \cdot k_2 + \text{errSet}) = \{\ \}$, $\forall k_1 \neq k_2$, where s can be considered a gap value that describes a difference between inverses of two root values, and each of k1 and k2 can describe an integer value associated with a frequency offset for a subcarrier. In some scenarios, the errSet can be set as $\{e, \pm u_2^{-1} + e | e = 0, \pm 1\}$ or $\{0, \pm 1\}$.

The errors partly depend on the $u_2^{-1}$, therefore the techniques described in this patent document design different $s = u_1^{-1} - u_2^{-1}$ for different $u_2^{-1}$. A value for s can be chosen to improve TO and/or FO estimation performance, but it also may reduce the maximum estimable FO. Let L denote the length of a ZC sequence. Some design methods are presented as follows, and given $u_2^{-1}$, one or more of the methods described below can be chosen according to the maximum integer FO K, where K can also be calculated by $\lfloor \max \text{FO}/\text{SCS} \rfloor$.

In an example embodiment, a base station (also known as a network node) may select a gap value s based on one of the following four equations:

$$s = 2 * \min(u_2^{-1}, L - u_2^{-1}) + 3$$

$$s = 3$$

$$s = \text{abs}(L - 2 * u_2^{-1}) + 3$$

$$s = \lfloor L/(2K+1) \rfloor$$

where $u_2$ can be considered a first root value of a ZC sequence and K is the maximum integer FO. The base station can transmit the first root value and the gap value to a UE. The disclosed techniques for root pair selection can include determining a gap value s from root $u_2$. Section III below describes four examples that four methods to calculate s based on $u_2$.

II. Configuration of Root Pair

A network node can signal or transmit the root pair configuration to UEs. In current NR specification, the PRACH root starting index is indicated by BS to UEs in SIB1 (including prach-RootSequenceIndex, restrictedSetConfig, zeroCorrelationZoneConfig). UE uses these parameters to calculate the PRACH root index that can be used. According to the analysis described in Section I above, in an example embodiment at least two parameters can be signaled or sent to UEs to implement the root pair selection. For example, the base station can transmit to the UE (1) the first PRACH root index and (2) a gap value between the second PRACH root index and the first PRACH root index. Exemplary techniques for performing pair selection and configuration signaling are further described below.

III. Examples of Root Pair Selection Method

III.(a) Example 1: Determining Root Pair from Selection Method 1

If a base station determines or selects $u_2^{-1} = 3$, L=839, then according to method 1, s is set to 9. In this example, with respect to mod L, $(s \cdot k_1 + \text{errSet}) \cap (s \cdot k_2 + \text{errSet})$ is empty set for $\forall k_1 \neq k_2$; $|k_1|, |k_2| < 45$, where errSet is $\{-4, -3, \ldots, 4\}$. In this example, if the maximum integer FO (also known as the maximum integer value associated with FO) is not larger than 45 SCS and the error in the receiver side for the peak difference is in the errSet, then the receiver (or UE) can estimate the correct integer FO or the correct integer value of FO.

III.(b). Example 2: Determining Root Pair from Selection Method 2

If a base station determines or selects $u_2^{-1} = 200$, L=839, then according to the method 2, s is set to 3. In this example, $(s \cdot k_1 + \text{errSet}) \cap (s \cdot k_2 + \text{errSet})$ is empty set for $\forall k_1 \neq k_2$; $|k_1|$, $|k_2| < 32$, where errSet is $\{e, \pm 200 + e | e = 0, \pm 1\}$. In this situation, if the maximum integer FO is not larger than 32 SCS and the error in the receiver side for the peak difference is in the errSet, then the receiver (or UE) can estimate the correct integer FO.

III.(c). Example 3: Determining Root Pair from Selection Method 3

If a base station determines or selects $u_2^{-1} = 420$, $L = 839$, then according to the method 3, s is set to 4. In this example, $(s \cdot k_1 + \text{errSet}) \cap (s \cdot k_2 + \text{errSet})$ is empty set for $\forall k_1 \neq k_2$; $|k_1|$, $|k_2| < 51$, where errSet is $\{e, \pm 420 + e | e = 0, \pm 1\}$. In this situation, if the maximum integer FO is not larger than 51 SCS and the error in the receiver side for the peak difference is in the errSet, then the receiver is able to estimate the correct integer FO.

III.(d). Example 4: Determining Root Pairs from Selection Method 4

In order to reduce the estimation error of integer FO, the errSet is derived and the maximum integer FO is limited. Suppose the maximum FO is very large (e.g., greater than a predetermined value), then the limitation for maximum integer value of FO in the first three example design methods 1 to 3 (described above) may be not enough. In this situation, the errSet can be modified to enlarge the limitation for maximum integer value of FO.

If the root $u_1$ is used as the first ZC root, then the second ZC root $u_2$ is chosen such that $(u_1^{-1} - u_2^{-1})(\text{mod } L) = s$ or $(u_2^{-1} - u_1^{-1})(\text{mod } L) = s$. The base station can select s as the maximum integer value such that $(2K+1) \cdot s \leq L$, where K is the maximum integer FO of the given beam. The equation $(2K+1) \cdot s \leq L$ can be used to find the largest integer s and can be considered to be the same as $s = \lfloor L/(2K+1) \rfloor$.

In Examples 1-4, the base station can transmit the first root value $u_2$ and the gap value s to a UE, or the base station can determine the second root value $u_1$ from $u_2$ and gap value s and transmit the first root value $u_2$ and the second root value $u_1$ to a UE, or the base station can transmit to a UE an index value associated with the first root value $u_2$ and/or the gap value s.

IV. Configuration of Root Pair

Figure 2:
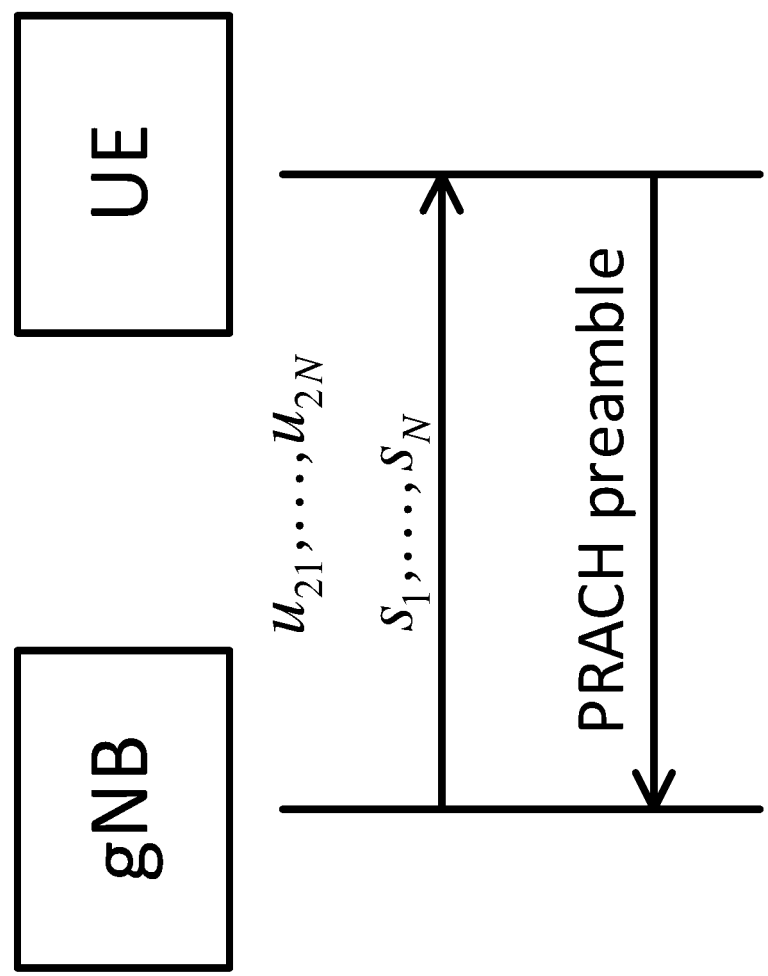
FIG. 2 shows an example technique where a base station sends notification of a set of root values $u_{21}, \ldots u_{2N}$ for Zadoff-Chu (ZC) sequences and peak differences or gap values $s_1, \ldots, s_N$.

IV.(a) Example 5: Determining Root Pairs with Notified Root Values and Peak Differences In some scenarios, different cells can have different maximum FOs. In such scenarios, a BS can choose appropriate ZC root values $u_{21}, \ldots u_{2N}$ and peak differences $s_1, \ldots, s_N$ using the techniques described in Examples 1-4 and the four equations mentioned in Section I. As shown in FIG. 2, the base station can transmit one set of root values and peak differences (or gap values) to UEs. The one set of root values and peak differences can be sent to UEs in system information block (SIB), and UEs in the cell can chose the ZC root pair such that for an N value the following equation is satisfied: $(u_1^{-1} - u_2^{-1})(\text{mod } L) = s$. The UE can determine a second set of root values from the first set of root values and the peak differences using the above noted equation in this example. The UE can construct a preamble that can be transmitted to the BS over PRACH as shown in FIG. 2.

IV.(b) Example 6: Determining Root Pairs with Notified Root Values

Figure 3:
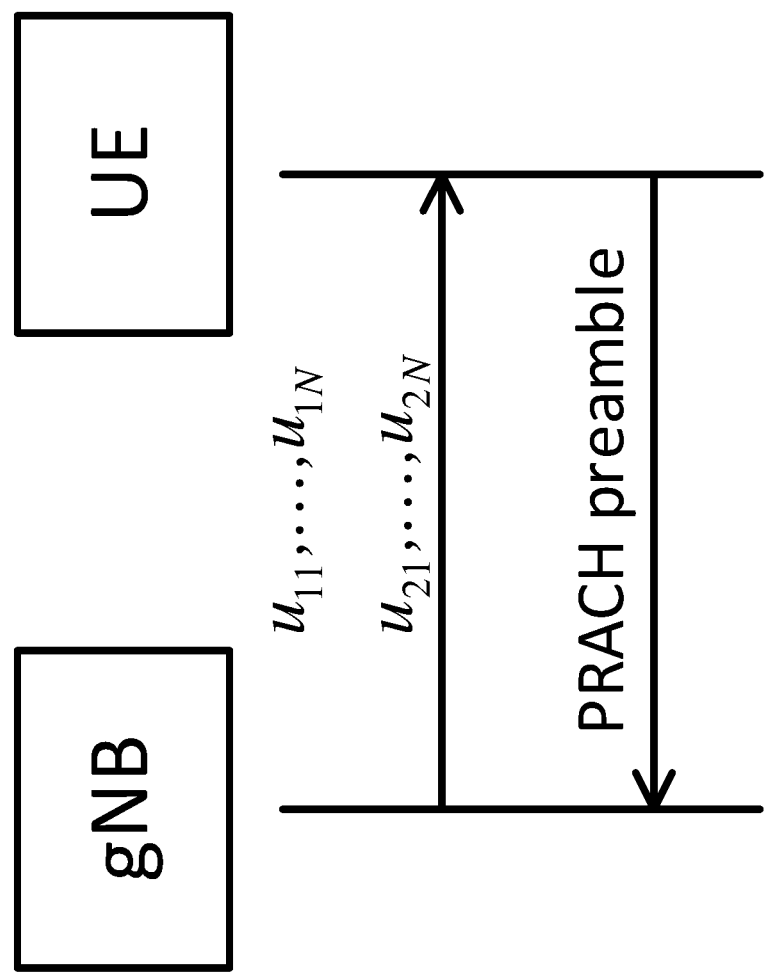
FIG. 3 shows an example technique where a base station sends notification of two sets of root-pair values $u_{11}, \ldots u_{1N}$ and $u_{21}, \ldots u_{2N}$ for Zadoff-Chu (ZC) sequences.

In some scenarios, different cells can have different maximum FOs. In such scenarios, a BS can choose appropriate ZC root values $u_{11}, \ldots, u_{1N}$ and $u_{21}, u_{2N}$, in which $u_{1n}^{-1} - u_{2n}^{-1} = s_n$ using the techniques described in Examples 1-4 and the four equations mentioned in Section I. In this example, the base station can send a set of root pair values to UEs as shown in FIG. 3, where the set of root pair values includes a first set of root values (e.g., $u_{11}, \ldots, u_{1N}$) and a second set of root values (e.g., $u_{21}, \ldots, u_{2N}$). The set of root pair values can be sent to UEs in SIB, and UEs in the cell can choose one root pair (e.g., $u_{14}$ and $u_{24}$) and construct a preamble that can be transmitted to the BS over PRACH as shown in FIG. 3.

Figure 4:
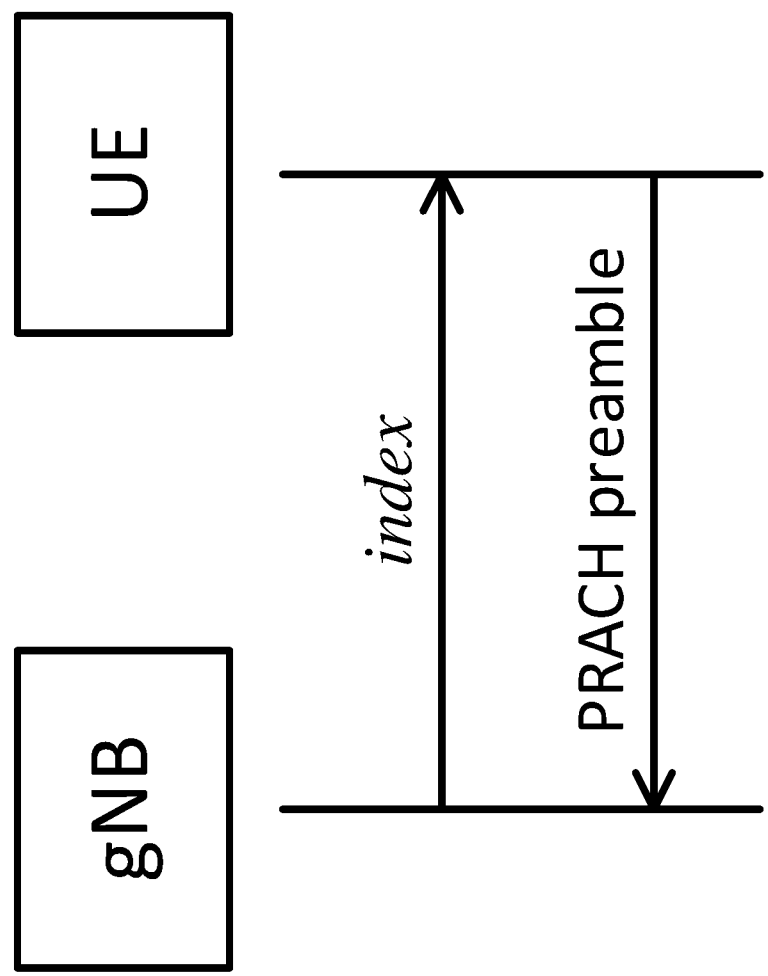
FIG. 4 shows an example technique where a base station sends an index value associated with a selection of a root value and a gap value.

IV.(c). Example 7: Determining Root Pairs with a Predefined Table and Notified Index In PRACH of NR, a table of ZC root values can be predefined (or pre-stored in the BS and/or UE). The BS can send to a UE an index value (as shown in FIG. 4) to enable the UE to construct a preamble pool. As compared to transmitting a notification of the whole preamble pool, the transmission of an index value for a predefined table can save signaling resources. Similarly, the ZC root pairs can be predefined in a table, and the BS can send an index instead of the whole root pairs. Table 1 (shown below) is an example of a predefined table that can include a plurality of root values and a plurality of gap values, where each root value and each corresponding gap value is associated with one index value. Each of the fifteen columns to the right of the three variables $u_2$, s, and max $f_{int}$ are associated with one index value. For example, index value 1 is associated with a value of 10 for $u_2$, 31 for s, and 1 for max $f_{int}$.

TABLE 1

| 0-14 | $u_2$ | 107 | 10 | 64 | 63 | 76 | 75 | 129 | 32 | 31 | 14 | 38 | 58 | 102 | 113 | 90 |
|---|---|---|---|---|---|---|---|---|---|---|---|---|---|---|---|---|
| | s | 29 | 31 | 3 | 3 | 3 | 3 | 31 | 29 | 21 | 23 | 25 | 27 | 3 | 3 | 3 |
| | max $f_{int}$ | 1 | 1 | 1 | 1 | 1 | 1 | 1 | 1 | 2 | 2 | 2 | 2 | 2 | 2 | 2 |
| | | | | | | ... | | | | | | | | | | |
| 123-137 | $u_2$ | 57 | 93 | 34 | 136 | 71 | 68 | 3 | 105 | 46 | 137 | 2 | 70 | 69 | 1 | 138 |
| | s | 3 | 9 | 3 | 3 | 3 | 3 | 3 | 3 | 9 | 4 | 4 | 7 | 7 | 5 | 5 |
| | max $f_{int}$ | 6 | 7 | 7 | 7 | 7 | 7 | 7 | 7 | 7 | 8 | 8 | 9 | 9 | 13 | 13 |

The predefined table can be a list of root pairs or a list of one root and one s. An example is as shown above, where the ZC length is 139 and max $f_{int}$ denote the maximum integer FO for the root pair. The BS can choose an index from $\{0, 1, \ldots, 137\}$ according to the maximum FO in this cell.

In some embodiment, when a UE receives in index value, the UE selects a set of root pair values that includes a set of first root values and a set of corresponding second root values according to a pre-defined or predetermined size of the set of root pair values. For example, if a base station transmits an index value of 5 to a UE and a pre-defined size of root pair values is 3, then the UE can determine or select three root pairs using the example Table 1 above to select (u2:75,s:3), (u2:129,s:31), and (u2:32,s:29). The UE can randomly choose one of the three root pair values as a preamble pair for PRACH transmission.

Example 8: Determining Root Pairs with Notified Beam Index

Figure 5:
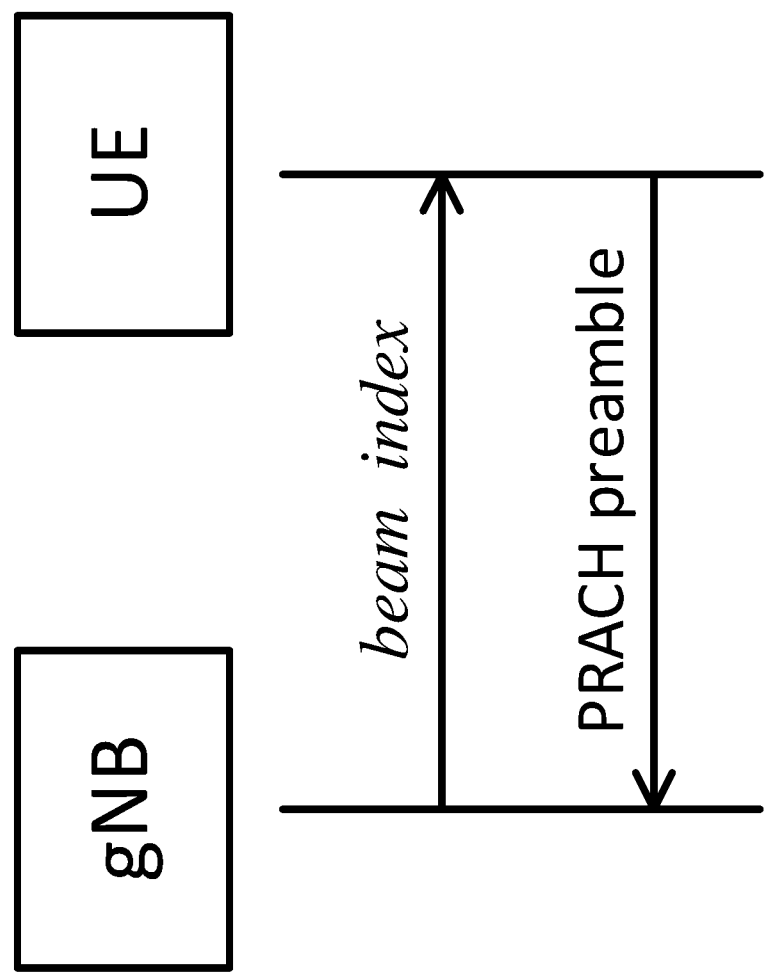
FIG. 5 shows an example technique where a base station sends a beam index value associated with a selection of a root value and a gap value.

In the scenario of satellite communication, each satellite may have multiple beams and each beam has an index. If the beams have fixed angle with respect to the satellite, then the maximum FO of each beam can be determined by the orbit altitude and beam deployment. If the root pairs for each beam are already predefined, the BS can send a beam index to the UEs (as shown in FIG. 5), where a predefined table includes a plurality of root values and a plurality of gap values, where each root value and each corresponding gap value that is associated with one index value can also be associated with one beam index value. In some embodiments, the pre-defined table used for Example 8 can be Table 1 as shown above.

In some embodiments, not every index value shown in Table 1 may be associated with a beam index at least because the beam index may be less than a number of root values. In such embodiments, at least some index values may be associated with a beam index.

Figure 6A:
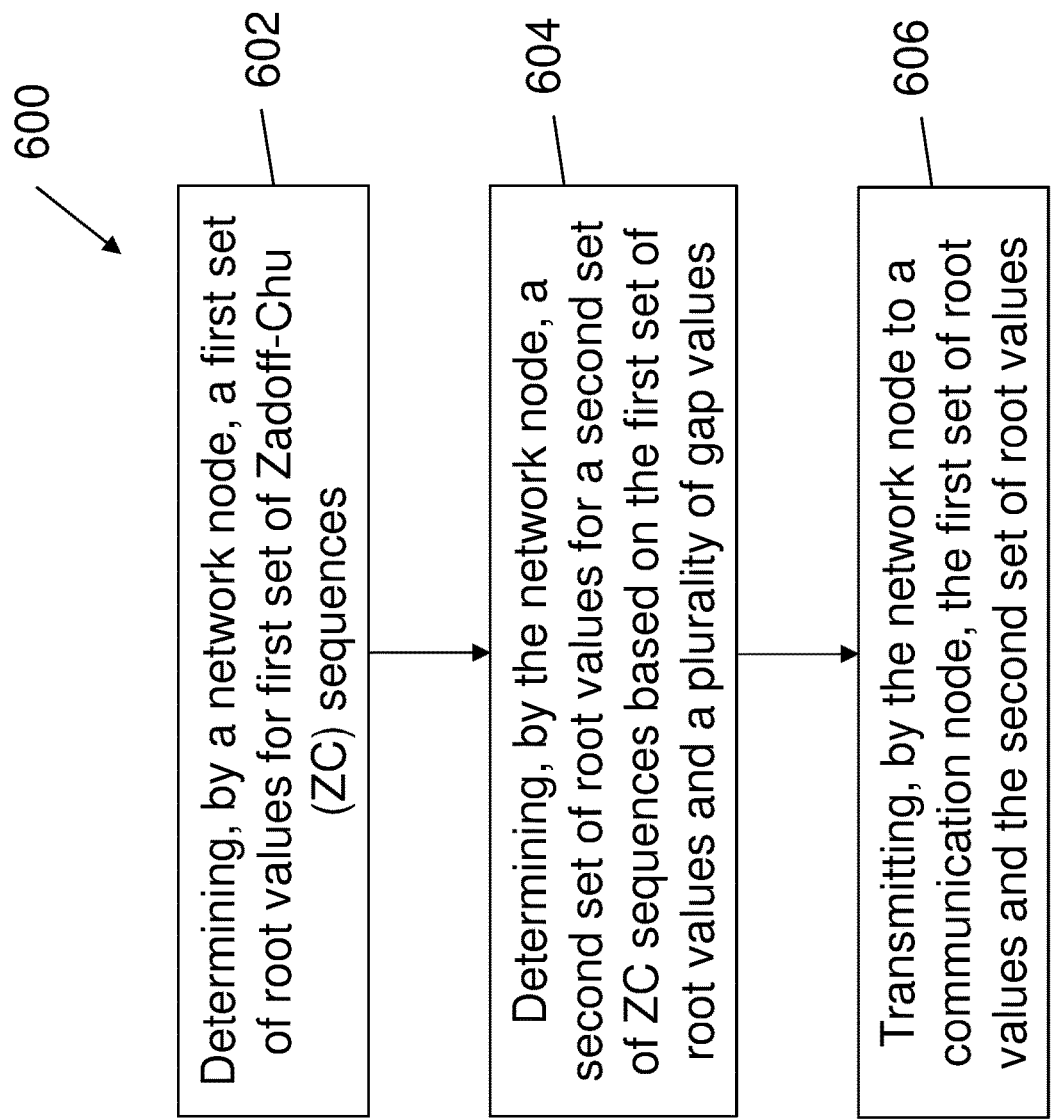
FIG. 6A shows an exemplary method for selecting two sets of root values for a communication node.

FIG. 6A shows an exemplary method 600 for selecting two sets of root values for a communication node. At operation 602, a network node determines a first set of root values for first set of Zadoff-Chu (ZC) sequences. At operation 604, the network node determines a second set of root values for a second set of ZC sequences based on the first set of root values and a plurality of gap values. The plurality of gap values describes differences between inverses of root values from the first set of root values and corresponding inverses of root values from the second set of root values. At operation 606, the network node transmits to a communication node the first set of root values and the second set of root values.

In some embodiments for method 600, each gap value from the plurality of gap values is determined using a following equation: $s=2*\min(u_2^{-1}, L-u_2^{-1})+3$, where $u_2$ is a first root value from the first set of root values, s is a gap value, and L is a length of a ZC sequence. In some embodiments for method 600, each gap value from the plurality of gap values is 3. In some embodiments for method 600, each gap value from the plurality of gap values is determined using a following equation: $s=abs(L-2*u_2^{-1})+3$, where $u_2$ is a first root value from the first set of root values, s is the gap value, and L is a length of a ZC sequence.

In some embodiments for method 600, each gap value from the plurality of gap values is determined using a following equation: $s=\lfloor L/(2K+1) \rfloor$, where s is a gap value, K is a maximum integer value of a frequency offset for a beam of the network node, and L is a length of a ZC sequence. In some embodiments for method 600, each gap value from the plurality of gap values is determined using a following equation: $s=(u_1^{-1}-u_2^{-1})(\mod L)$ or $s=(u_2^{-1}-u_1^{-1})(\mod L)$, where $u_2$ is a first root value from the first set of root values, $u_1$ is a second root value from the second set of root values, s is a gap value, and L is a length of a ZC sequence. In some embodiments for method 600, the first set of root values and the second set of root values are transmitted in a system information block.

Figure 6B:
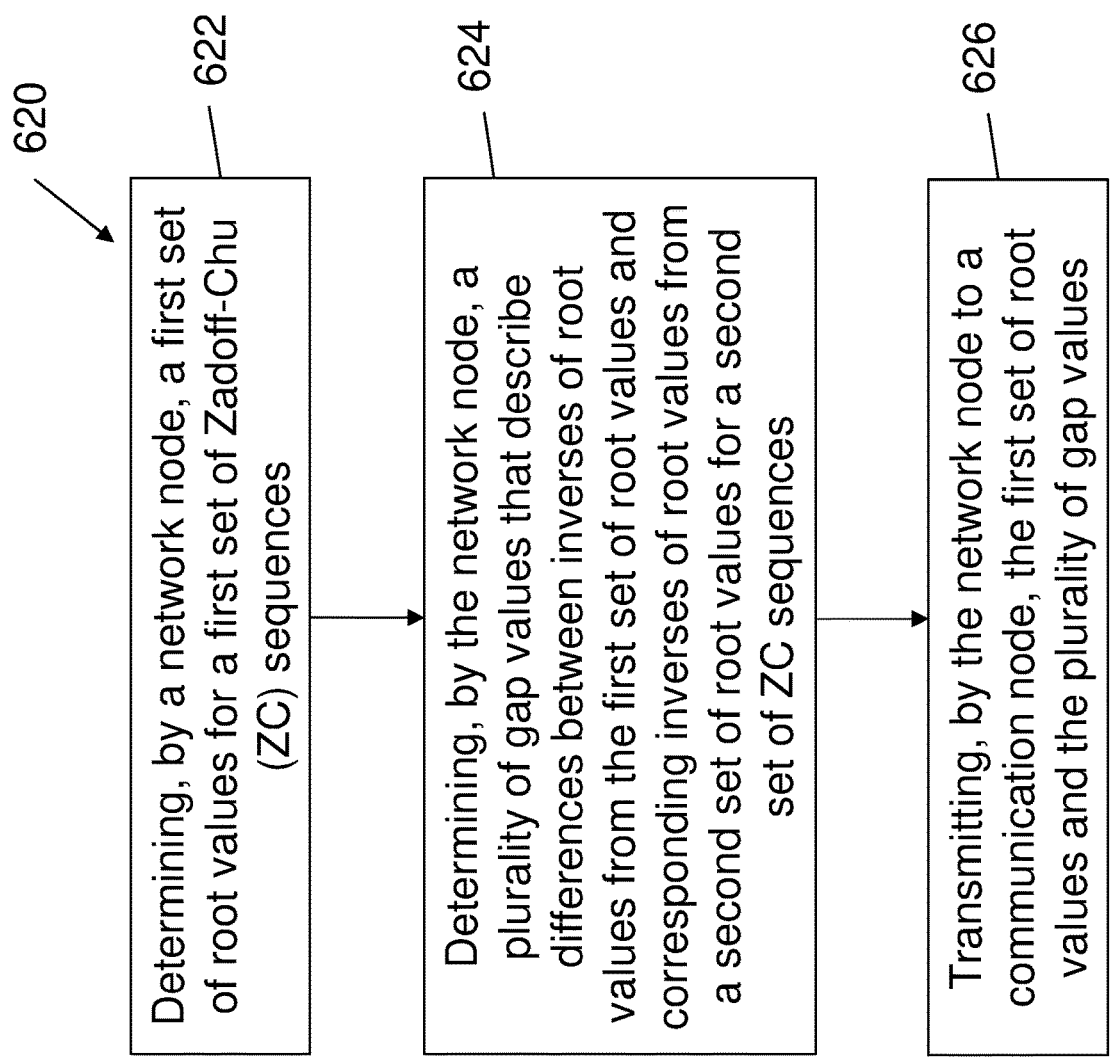
FIG. 6B shows an exemplary method for selecting a first set of root values and a plurality of gap values for a communication node.

FIG. 6B shows an exemplary method 620 for selecting a first set of root values and a plurality of gap values for a communication node. At operation 622, a network node determines a first set of root values for a first set of Zadoff-Chu (ZC) sequences. At operation 624, the network node determines a plurality of gap values that describe differences between inverses of root values from the first set of root values and corresponding inverses of root values from a second set of root values for a second set of ZC sequences. At operation 626, the network node transmits to a communication node the first set of root values and the plurality of gap values.

In some embodiments for method 620, each gap value from the plurality of gap values is determined using a following equation: $s=2*\min(u_2^{-1}, L-u_2^{-1})+3$, where $u_2$ is a first root value from the first set of root values, s is a gap value, and L is a length of a ZC sequence. In some embodiments for method 620, each gap value from the plurality of gap values is 3. In some embodiments for method 620, each gap value from the plurality of gap values is determined using a following equation: $s=abs(L-2*u_2^{-1})+3$, where $u_2$ is a first root value from the first set of root values, s is a gap value, and L is a length of a ZC sequence.

In some embodiments for method 620, each gap value from the plurality of gap values is determined using a following equation: $s=\lfloor L/(2K+1) \rfloor$, where s is a gap value, K is a maximum integer value of a frequency offset for a beam of the network node, and L is a length of a ZC sequence. In some embodiments for method 620, each gap value from the plurality of gap values is determined using a following equation: $s=(u_1^{-1}-u_2^{-1})(\mod L)$ or $s=(u_2^{-1}-u_1^{-1})(\mod L)$, where $u_2$ is a first root value from the first set of root values, $u_1$ is a second root value from the second set of root values, s is a gap value, and L is a length of a ZC sequence. In some embodiments for method 620, the first set of root values and the plurality of gap values are transmitted in a system information block.

Figure 6C:
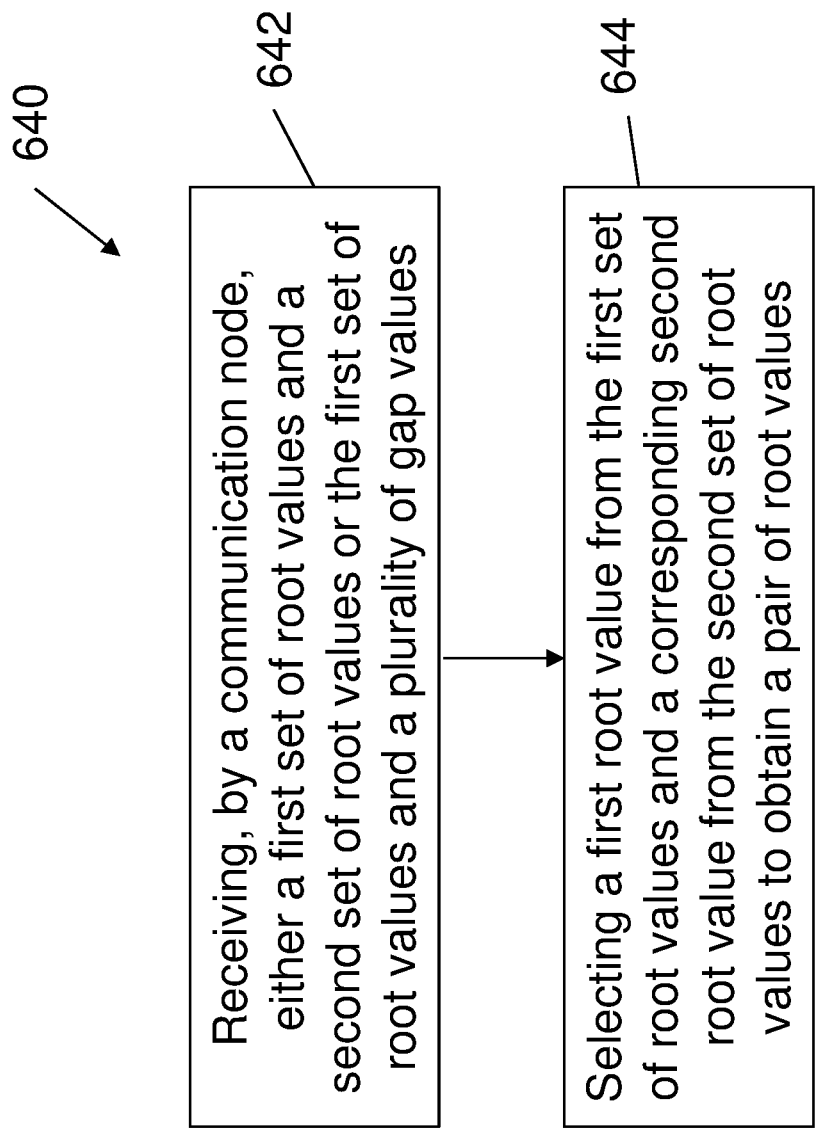
FIG. 6C shows an exemplary method for selecting root pair values from received sets of root pair values or received set of root values and gap values.

FIG. 6C shows an exemplary method 640 for selecting root pair values from received sets of root pair values or received set of root values and gap values. At operation 642, a communication node receives either a first set of root values and a second set of root values or the first set of root values and a plurality of gap values. Each of the first set of root values and the second set of root values includes plurality of root values for Zadoff-Chu (ZC) sequences, and the plurality of gap values describe differences between inverses of root values from the first set of root values and corresponding inverses of root values from the second set of root values. At operation 644, the communication node selects a first root value from the first set of root values and a corresponding second root value from the second set of root values to obtain a pair of root values.

In some embodiments for method 640, the first root value and the corresponding second root value are selected such that $(u_1^{-1}-u_2^{-1})(\mod L)=s$, where $u_1$ is the first root value, $u_2$ is the corresponding second root value, s is a gap value corresponding to the first root value and the corresponding second root value, and L is the length of a ZC sequence. In some embodiments for method 640, the first set of root values, the second set of root values, or the plurality of gap values are received in a system information block. In some embodiments for method 640, the method further comprises performing random access transmission using the first root value and the corresponding second root value.

Figure 6D:
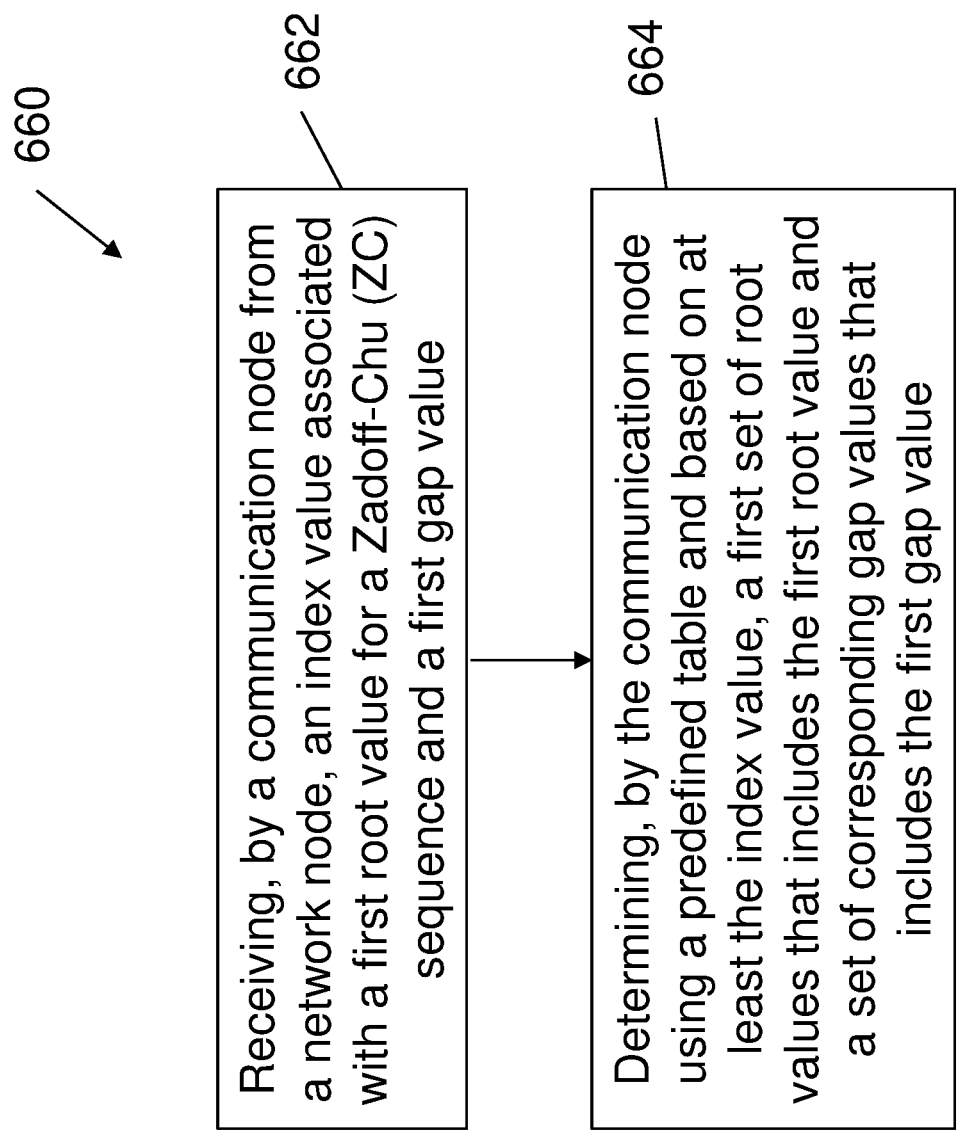
FIG. 6D shows an exemplary method for selecting sets of root pair values from received index value.

FIG. 6D shows an exemplary method 660 for selecting sets of root pair values from received index value. At operation 662, a communication node receives from a network node an index value associated with a first root value for a Zadoff-Chu (ZC) sequence and a first gap value. The first gap value describes a difference between an inverse of the first root value and an inverse of a second root value for a second ZC sequence. At operation 644, the communication node determines, using a predefined table and based on at least the index value, a first set of root values that includes the first root value and a set of corresponding gap values that includes the first gap value.

In some embodiments for method 660, the first root value and the first gap value are associated with the index value in the predefined table, and one or more remaining root values from the first set of root values and corresponding one or more remaining gap values from the set of corresponding gap values are determined from the predefined table using the index value and a predefined size of root pair values. In some embodiments for method 660, the one or more remaining root values and the corresponding one or more remaining gap values are determined from a number of columns of the predefined table that are immediately adjacent to a column associated with the index value, and the number of columns is the predefined size of root pair values minus one.

In some embodiments for method 660, the predefined table comprises a plurality of root values and a plurality of gap values, and each column of the predefined table is associated with one index value, one root value and one gap value. In some embodiments for method 660, the index value is associated with a beam index value that identifies a beam from a plurality of beams of the network node. In some embodiments for method 660, the method further comprises performing random access transmission using a root value from the first set of root values and another root value from a second set of root values, where the second set of root values are determined using the first set of root values and the set of corresponding gap values.

Figure 7:
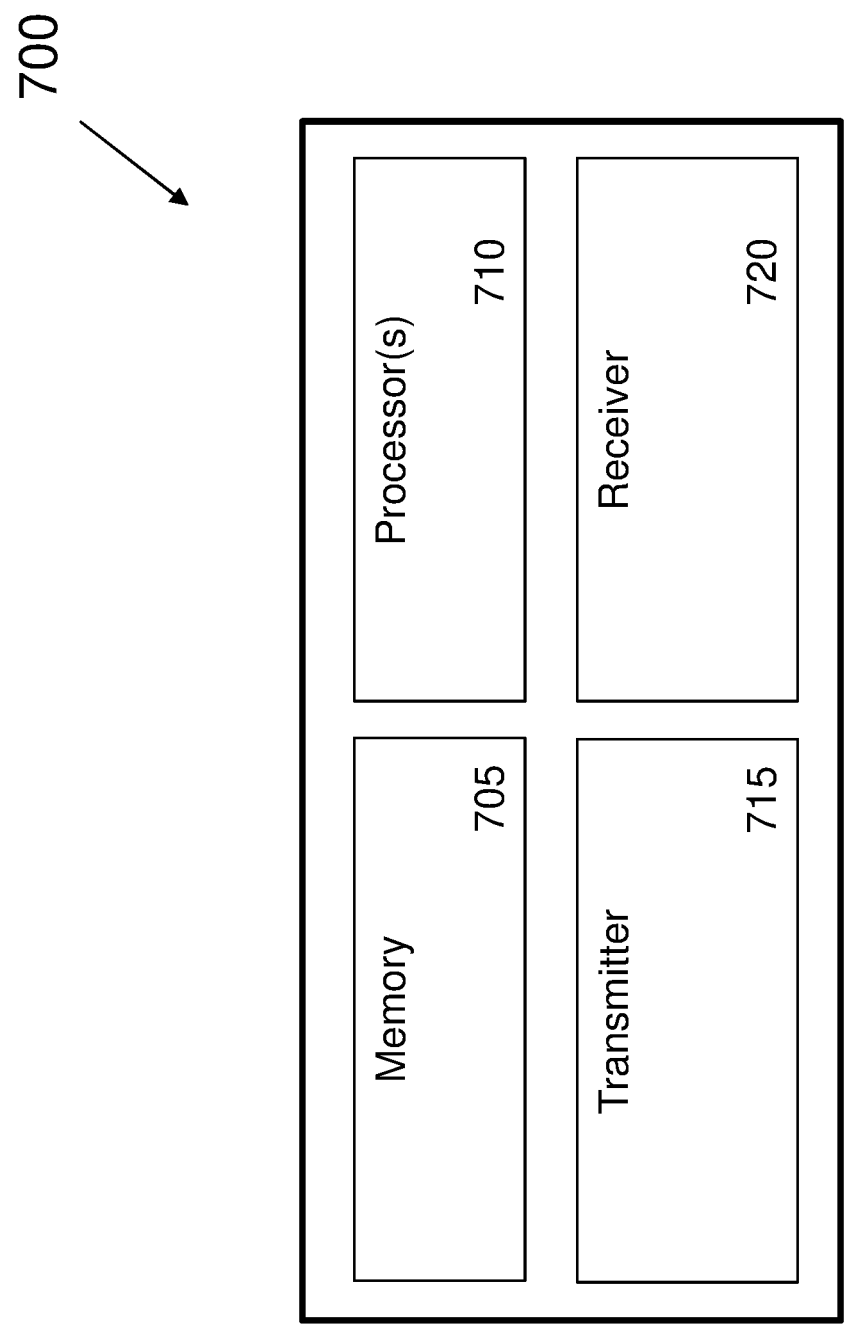
FIG. 7 shows an exemplary block diagram of a hardware platform that may be a part of a network node or a user equipment.

FIG. 7 shows an exemplary block diagram of a hardware platform 700 that may be a part of a network node (e.g, base station) or a user equipment (also known as communication node). The hardware platform 700 includes at least one processor 710 and a memory 705 having instructions stored thereupon. The instructions upon execution by the processor 710 configure the hardware platform 700 to perform the operations described in FIGS. 1 to 6D and in the various embodiments described in this patent document. The transmitter 715 transmits or sends information or data to another node. For example, a network node transmitter can send a first root value and a gap value to a user equipment. The receiver 720 receives information or data transmitted or sent by another node. For example, a user equipment can receive a first root value, a second root value, and a gap value from a network node.

In this document, the network node or communication node can perform the "determine" or "determining" operations by performing a "select" or "selecting" operation. In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
   determining, by a network node, a first set of root values for first set of Zadoff-Chu (ZC) sequences;
   determining, by the network node, a second set of root values for a second set of ZC sequences based on the first set of root values and a plurality of gap values,
      wherein the plurality of gap values describes differences between inverses of root values from the first set of root values and corresponding inverses of root values from the second set of root values, and
      wherein each gap value from the plurality of gap values is a function of a length of a ZC sequence; and transmitting, by the network node to a communication node, the first set of root values and the second set of root values.

2. The method of claim 1, wherein each gap value from the plurality of gap values is determined using a following equation: $s=2*\min(u_2^{-1},L-u_2^{-1})+3$, wherein $u_2$ is a first root value from the first set of root values, s is a gap value, and L is the length of the ZC sequence.

3. The method of claim 1, wherein each gap value from the plurality of gap values is determined using a following equation: $s=abs(L-2*u_2^{-1})+3$, wherein $u_2$ is a first root value from the first set of root values, s is the gap value, and L is the length of the ZC sequence.

4. The method of claim 1, wherein each gap value from the plurality of gap values is determined using a following equation: $s=\lfloor L/(2K+1) \rfloor$, wherein s is a gap value, K is a maximum integer value of a frequency offset for a beam of the network node, and L is the length of the ZC sequence.

5. The method of claim 1, wherein each gap value from the plurality of gap values is determined using a following equation: $s=(u_1^{-1}-u_2^{-1})(\bmod L)$ or $s=(u_2^{-1}-u_1^{-1})(\bmod L)$, where $u_2$ is a first root value from the first set of root values, $u_1$ is a second root value from the second set of root values, s is a gap value, and L is the length of the ZC sequence.

6. The method of claim 1, wherein the first set of root values and the second set of root values are transmitted in a system information block.

7. A wireless communication method, comprising:
receiving, by a communication node, a first set of root values and a second set of root values,
wherein each of the first set of root values and the second set of root values includes plurality of root values for Zadoff-Chu (ZC) sequences,
wherein the second set of root values are based on the first set of root values and a plurality of gap values, and
wherein the plurality of gap values describe differences between inverses of root values from the first set of root values and corresponding inverses of root values from the second set of root values, and
wherein each gap value from the plurality of gap values is a function of a length of a ZC sequence; and
selecting a first root value from the first set of root values and a corresponding second root value from the second set of root values to obtain a pair of root values.

8. The method of claim 7, wherein the first root value and the corresponding second root value are selected such that $(u_1^{-1}-u_2^{-1})(\bmod L)=s$, where $u_1$ is the first root value, $u_2$ is the corresponding second root value, s is a gap value corresponding to the first root value and the corresponding second root value, and L is the length of the ZC sequence.

9. The method of claim 7, wherein the first set of root values, the second set of root values, or the plurality of gap values are received in a system information block.

10. The method of claim 7, further comprising:
performing random access transmission using the first root value and the corresponding second root value.

11. A network node for wireless communication, comprising:
at least one processor and a memory having instructions stored thereupon, the instructions upon execution by the at least one processor configures the network node to:
determine a first set of root values for first set of Zadoff-Chu (ZC) sequences;
determine a second set of root values for a second set of ZC sequences based on the first set of root values and a plurality of gap values,
wherein the plurality of gap values describes differences between inverses of root values from the first set of root values and corresponding inverses of root values from the second set of root values, and
wherein each gap value from the plurality of gap values is a function of a length of a ZC sequence; and
transmit, to a communication node, the first set of root values and the second set of root values.

12. The network node of claim 11, wherein each gap value from the plurality of gap values is determined using a following equation: $s=2*\min(u_2^{-1},L-u_2^{-1})+3$, wherein $u_2$ is a first root value from the first set of root values, s is a gap value, and L is the length of the ZC sequence.

13. The network node of claim 11, wherein each gap value from the plurality of gap values is determined using a following equation: $s=abs(L-2*u_2^{-1})+3$, wherein $u_2$ is a first root value from the first set of root values, s is the gap value, and L is the length of the ZC sequence.

14. The network node of claim 11, wherein each gap value from the plurality of gap values is determined using a following equation: $s=\lfloor L/(2K+1) \rfloor$, wherein s is a gap value, K is a maximum integer value of a frequency offset for a beam of the network node, and L is the length of the ZC sequence.

15. The network node of claim 11, wherein each gap value from the plurality of gap values is determined using a following equation: $s=(u_1^{-1}-u_2^{-1})(\bmod L)$ or $S=(u_2^{-1}-u_1^{-1})(\bmod L)$, where $u_2$ is a first root value from the first set of root values, $u_1$ is a second root value from the second set of root values, s is a gap value, and L is the length of the ZC sequence.

16. The network node of claim 11, wherein the first set of root values and the second set of root values are transmitted in a system information block.

17. A communication node for wireless communication, comprising:
at least one processor and a memory having instructions stored thereupon, the instructions upon execution by the at least one processor configures the communication node to:
receive a first set of root values and a second set of root values,
wherein each of the first set of root values and the second set of root values includes plurality of root values for Zadoff-Chu (ZC) sequences,
wherein the second set of root values are based on the first set of root values and a plurality of gap values, and
wherein the plurality of gap values describe differences between inverses of root values from the first set of root values and corresponding inverses of root values from the second set of root values, and
wherein each gap value from the plurality of gap values is a function of a length of a ZC sequence; and
select a first root value from the first set of root values and a corresponding second root value from the second set of root values to obtain a pair of root values.

18. The communication node of claim 17, wherein the first root value and the corresponding second root value are selected such that $(u_1^{-1}-u_2^{-1})(\bmod L)=s$, where $u_1$ is the first root value, $u_2$ is the corresponding second root value, s is a gap value corresponding to the first root value and the corresponding second root value, and L is the length of the ZC sequence.

19. The communication node of claim 17, wherein the first set of root values, the second set of root values, or the plurality of gap values are received in a system information block.

20. The communication node of claim 17, wherein the at least one processor further configures the communication node to:

perform random access transmission using the first root value and the corresponding second root value.

* * * * *